(12) United States Patent
Burstein

(10) Patent No.: US 8,930,332 B2
(45) Date of Patent: Jan. 6, 2015

(54) METHOD AND SYSTEM FOR PARTITIONING SEARCH INDEXES

(75) Inventor: Paul Burstein, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 386 days.

(21) Appl. No.: 12/894,938

(22) Filed: Sep. 30, 2010

(65) Prior Publication Data

US 2011/0225165 A1    Sep. 15, 2011

Related U.S. Application Data

(60) Provisional application No. 61/313,611, filed on Mar. 12, 2010.

(51) Int. Cl.
*G06F 17/30* (2006.01)

(52) U.S. Cl.
CPC ............................... *G06F 17/30336* (2013.01)
USPC ......................................................... 707/696

(58) Field of Classification Search
CPC ................................................ G06F 17/30336
USPC .................................................. 707/756, 696
See application file for complete search history.

(56) References Cited

U.S. PATENT DOCUMENTS

| | | | |
|---|---|---|---|
| 5,551,027 A * | 8/1996 | Choy et al. ............ | 707/999.201 |
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |

(Continued)

OTHER PUBLICATIONS

Emmanuel Bernard & John Griffin, "Hibernate Search in Action", published Dec. 2008, Manning Publications.*

(Continued)

*Primary Examiner* — Rehana Perveen
*Assistant Examiner* — Scott A Waldron
(74) *Attorney, Agent, or Firm* — Blakely, Sokoloff, Taylor & Zafman

(57) ABSTRACT

Methods and systems for partitioning search indexes are described. In one embodiment, such a method includes identifying, via a partition manager, a search index to be partitioned, where the search index includes a plurality of entity types, and wherein each of the plurality of entity types associates records stored in a data store with the respective entity type within the search index. The method further includes partitioning, via the partition manager, the search index into a first partitioned search index and a second partitioned search index, correlating, via a partitioning scheme, a first subset of the plurality of entity types with the first partitioned search index, and correlating, via the partitioning scheme, a second subset of the plurality of entity types with the second partitioned search index.

25 Claims, 7 Drawing Sheets

(56) References Cited

U.S. PATENT DOCUMENTS

| | | | |
|---|---|---|---|
| 6,266,669 B1 | 7/2001 | Brodersen et al. | |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,336,137 B1 | 1/2002 | Lee et al. | |
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,571,231 B2* | 5/2003 | Sedlar | 707/999.001 |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker et al. | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,158,996 B2* | 1/2007 | Croisettier et al. | 707/741 |
| 7,340,411 B2 | 3/2008 | Cook | |
| 7,620,655 B2 | 11/2009 | Larsson et al. | |
| 2001/0044791 A1 | 11/2001 | Richter et al. | |
| 2002/0022986 A1 | 2/2002 | Coker et al. | |
| 2002/0029161 A1 | 3/2002 | Brodersen et al. | |
| 2002/0029376 A1 | 3/2002 | Ambrose et al. | |
| 2002/0035577 A1 | 3/2002 | Brodersen et al. | |
| 2002/0042264 A1 | 4/2002 | Kim | |
| 2002/0042843 A1 | 4/2002 | Diec | |
| 2002/0072951 A1 | 6/2002 | Lee et al. | |
| 2002/0082892 A1 | 6/2002 | Raffel et al. | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0152102 A1 | 10/2002 | Brodersen et al. | |
| 2002/0161734 A1 | 10/2002 | Stauber et al. | |
| 2002/0162090 A1 | 10/2002 | Parnell et al. | |
| 2002/0165742 A1 | 11/2002 | Robins | |
| 2003/0004971 A1 | 1/2003 | Gong et al. | |
| 2003/0018705 A1 | 1/2003 | Chen et al. | |
| 2003/0018830 A1 | 1/2003 | Chen et al. | |
| 2003/0066031 A1 | 4/2003 | Laane | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker | |
| 2003/0088545 A1 | 5/2003 | Subramaniam et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec | |
| 2003/0189600 A1 | 10/2003 | Gune et al. | |
| 2003/0191743 A1 | 10/2003 | Brodersen et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan, Jr. et al. | |
| 2004/0199489 A1 | 10/2004 | Barnes-Leon et al. | |
| 2004/0199536 A1 | 10/2004 | Barnes Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2005/0223022 A1* | 10/2005 | Weissman et al. | 707/102 |
| 2007/0124276 A1* | 5/2007 | Weissman et al. | 707/2 |
| 2007/0130137 A1* | 6/2007 | Oliver et al. | 707/5 |
| 2008/0077566 A1* | 3/2008 | Fell et al. | 707/4 |
| 2009/0063396 A1* | 3/2009 | Gangarapu et al. | 707/2 |
| 2011/0041006 A1* | 2/2011 | Fowler | 714/10 |

OTHER PUBLICATIONS

Mary Taylor & Chang Jie Guo, "Data Integration and Composite Business Services, Part 3: Build a Multi-Tenant Dat Tier with Access Control and Security", IBM Developerworks, posted Dec. 13, 2007.*

Bill Press, "Cloud-Scale Search at Salesforce.com", Lucene Revolution presentation, Oct. 26, 2010.*

Randy Shoup, "eBay's Architectural Principles: Architectural Strategies, Patterns, and Forces for Scaling a Large eCommerce Site", QCon London, Mar. 14, 2008.*

Salesforce.com, "The Force.com Multitenant Architecture: Understanding the Design of Salesforce.com's Internet Application Development Platform", Whitepaper (2008).*

Emmanuel Bernard & Aaron Walker, "Full-Text Search: Human Heaven and Database Savior in the Cloud", JavaOne slideshow, Jun. 3, 2009.*

Hibernate Development Team, "JBoss Enterprise Application Platform 4.2: Hibernate Search Reference Guide", Nov. 19, 2009.*

A. W. Leung et al., "High-Performance Metadata Indexing and Search in Petascale Data Storage Systems", Journal of Physics: Conference Series 125 (2008).*

Dong Yuanyuan et al., "Scaling the Data in Multi-Tenant Business Support System", 2009 IEEE Pacific-Asia Conference on Knowledge Engineering and Software Engineering, pp. 43-46.*

Fay Chang et al., "Bigtable: A Distributed Storage System for Structured Data", ACM Transactions on Computer Systems, Jun. 2008, vol. 26, No. 2, Article 4, pp. 1-26.*

\* cited by examiner

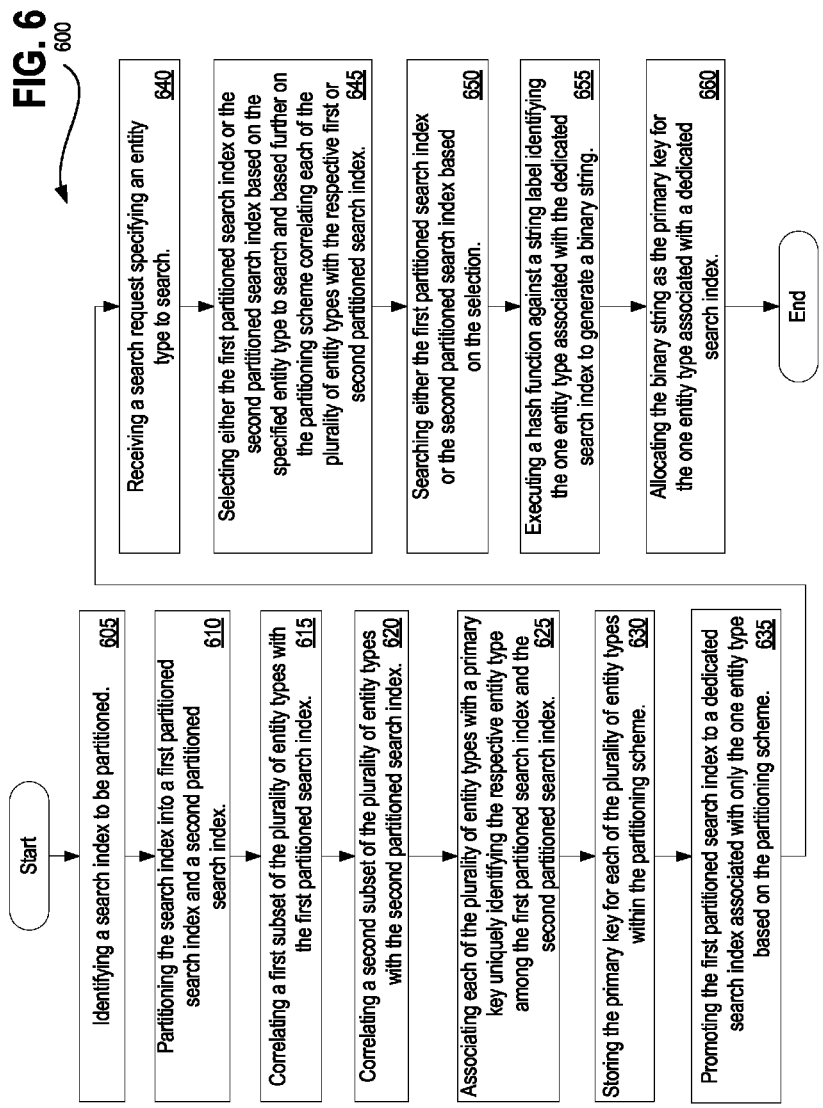

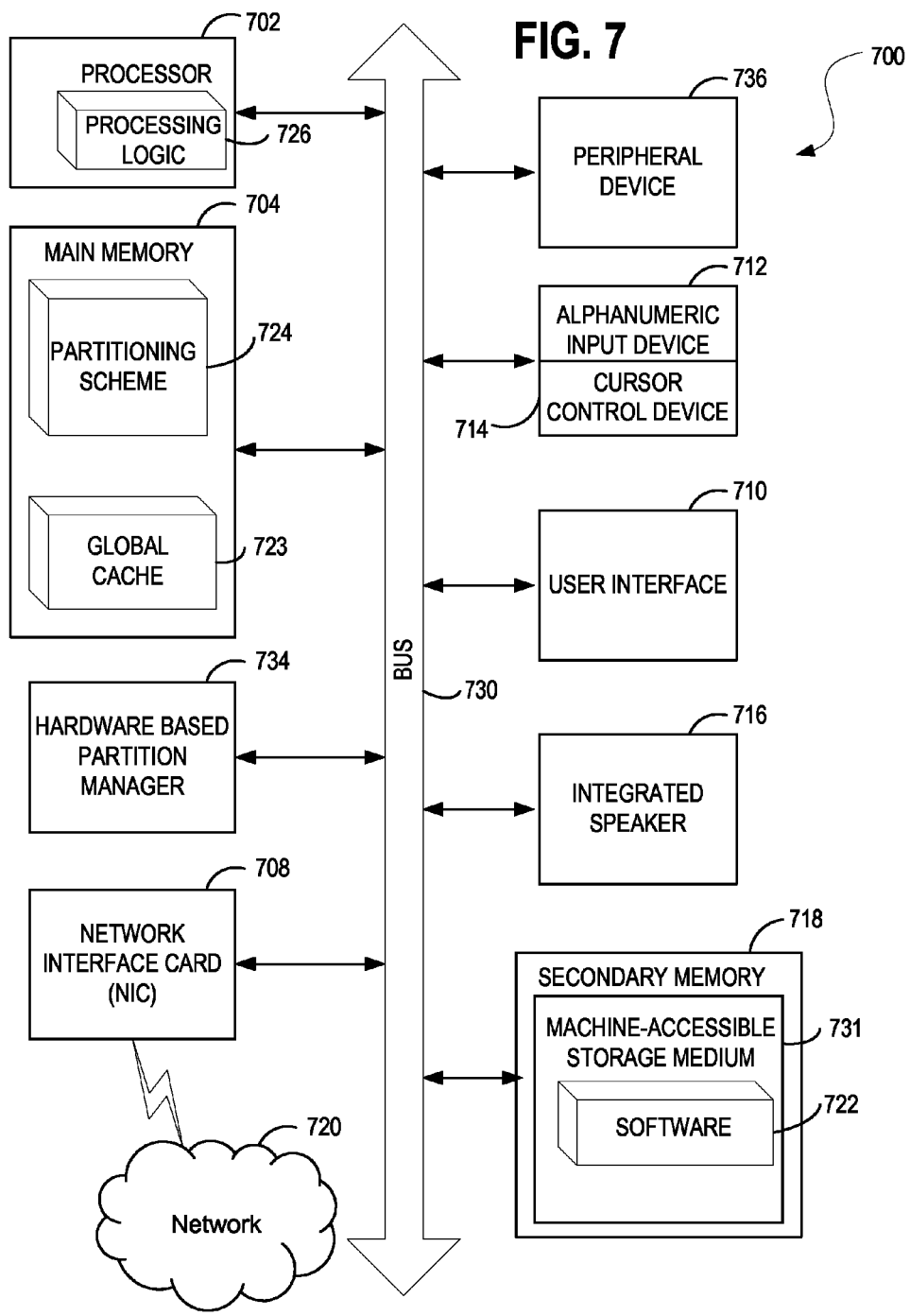

METHOD AND SYSTEM FOR PARTITIONING SEARCH INDEXES

CLAIM OF PRIORITY

This application is related to, and claims priority to, the provisional utility application entitled "Methods and System for Partitioning Search Indexes," filed on Mar. 12, 2010, having an application No. of 61/313,611, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The subject matter described herein relates generally to the field of computing, and more particularly, to methods and systems for partitioning search indexes.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed inventions.

Within a computing environment, it is commonly necessary to search for stored documents and records within a data store. It is sometimes also necessary or desirable to search for information, such as text strings or other quantifiable data within, for example, records, documents, files, or other objects stored within a data store or similar repository. Unfortunately, searching through records or searching for text and other data within records and within documents can be extraordinarily expensive in terms of computational resources. Search indexes have thus been developed that provide cross referencing capabilities, links, and pointers to desirable information. For example, rather than searching through a large repository of files for a specified data element, a search index can be created ahead of time, and then the search index itself can be searched, which in turn points to the appropriate results (for example, the appropriate records or files corresponding to a search term, such as having a specified string therein) within the repository of files or other data store. Because search indexes are typically much smaller than the sum of the actual corresponding records and files that would otherwise be searched, executing a search against the smaller search index is generally much faster.

Notwithstanding the benefits of indexing information and creating search indexes for a data store, the task of indexing information also requires computational resources. Moreover, managing the indexes and searching the indexes carries with it an overhead cost, for example, in the form of additional computing resource requirements, storage requirements, and complexity, that is not directly attributable toward processing a requested search.

As the size of a search index grows, these overhead costs can become significant and can degrade the performance and operating efficiency of a system designed to search the indexes and retrieve appropriate records and files from the data store. As the search indexes themselves grow in size, more and more time or processing power is required to retrieve a desired result. As the data store grows larger and the corresponding search index also grows, the time it takes to process a search request and return results continues to increase and can reflect negatively upon the search provider due to a poor user experience owing to the increased search times.

BRIEF DESCRIPTION OF THE DRAWINGS

Embodiments are illustrated by way of example, and not by way of limitation, and can be more fully understood with reference to the following detailed description when considered in connection with the figures in which:

FIG. 6 is a flow diagram illustrating a method for partitioning search indexes in accordance with one embodiment; and FIG. 7 illustrates a diagrammatic representation of a machine in the exemplary form of a computer system, in accordance with one embodiment.

DETAILED DESCRIPTION

Figure 1:
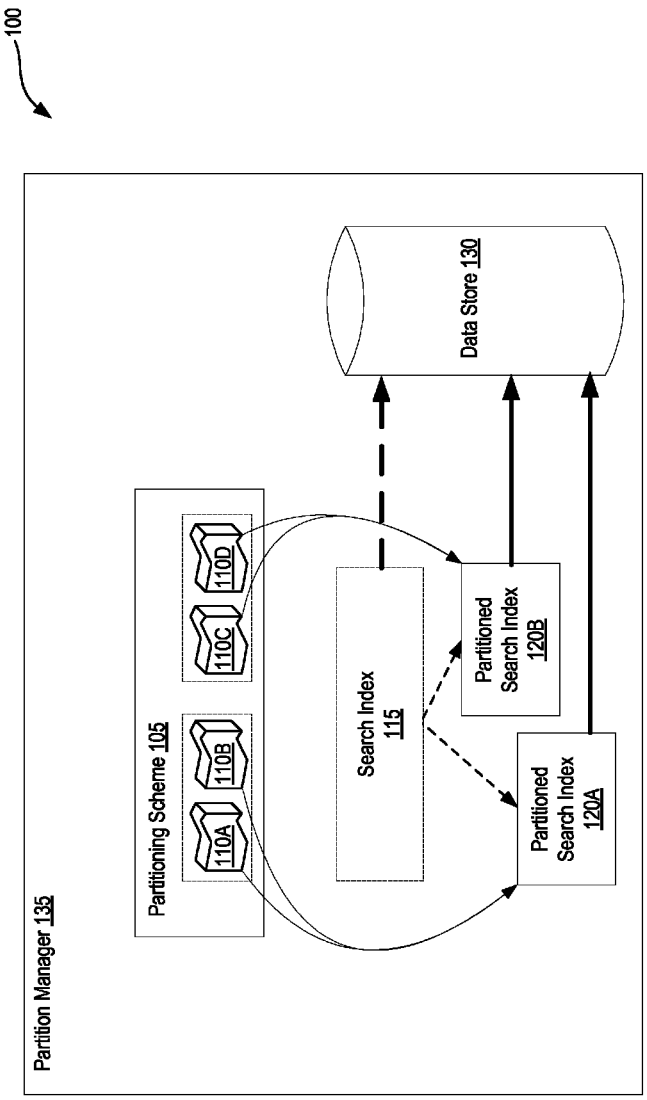
FIG. 1 illustrates an exemplary architecture in which embodiments may operate.

Described herein are systems, devices, and methods for partitioning search indexes. In one embodiment, such a method includes identifying, via a partition manager, a search index to be partitioned, where the search index includes a plurality of entity types, and wherein each of the plurality of entity types associates records stored in a data store with the respective entity type within the search index. The method further includes partitioning, via the partition manager, the search index into a first partitioned search index and a second partitioned search index, correlating, via a partitioning scheme, a first subset of the plurality of entity types with the first partitioned search index, and correlating, via the partitioning scheme, a second subset of the plurality of entity types with the second partitioned search index.

Throughout the description, various examples of indexes, partitioned indexes, dedicated indexes, and shared indexes are provided. The following general descriptions of each may be helpful in better understanding the more detailed embodiments set forth below. For example, In accordance with certain embodiments, multiple customers, organizations, subscribers, or users, each having their own distinct collections of data, may make use of the multi-tenant database implementation for storing their data. So as to optimize searching and other functions, an "index" is provided for certain collections of data. For example, an index may be provided for all data associated with one particular customer, thus improving search capabilities for information within that customer's collection of data. As an index grows too large in size, a new index may be introduced into which indexing information for new or additional data is added. An old partition scheme or global partition scheme is one for which no organization is introduced with respect to the introduction of the new index, and thus, any search of a particular customer's data requires searching through all old or global indexes associated with that particular customer. Conversely, a "shared partition" or a "dedicated partition" as discussed herein adhere to certain rules and organizational constructs as set forth in detail below. For example, a shared partition may be associated with only one customer, but the shared partition considered to be "shared" because it is associated with multiple entity types (e.g., a type or category of data) for that customer. Some customers may therefore be associated with only one shared partition which provides indexing for all of that customer's data, notwithstanding the enumeration of multiple entity types for such a customer's data. A shared partition that grows to exceed a threshold size may be partitioned into two or more "partitioned search indexes." Each of the partitioned search indexes may be "shared" in the sense that each still provides indexing capabilities for more than one entity type. Finally, if a single entity type causes an index to be sufficiently large in size, it may be promoted, designated, or allocated as a "dedicated partition." A dedicated partition is a partition that is associated with only one entity type.

In the disclosed embodiments, search indexes of all types provide indexing capabilities for an underlying data store, such as a communicatively interfaced multi-tenant database implementation, single-tenant database implementation, or a mixed relational and non-relational database implementation available to a single tenant or to multiple tenants. The underlying indexing of data in the data store may be provided by a separate indexing application. In one embodiment, the indexing application does not require modification to implement the described techniques, or even be made aware of search index partitioning. For example, an indexing application may be applied against each of the individual search index partitions or individual partitioned search indexes without having knowledge that other partitioned search indexes exist. Stated differently, the indexing application may, but does not necessarily need to provide the partitioning capabilities described herein as the methodologies may be implemented via an independent system or application. One such indexing application that may be used to index data and provide search indexes is the open source software application by the name of Lucene. Lucene does not provide the capabilities described herein for partitioning search indexes, but could nevertheless be utilized to provide the basic underlying indexing capability.

Lucene's indexing capabilities provide full text indexing and searching. At the core of Lucene's logical architecture is the concept of a document containing fields of text. This flexibility allows Lucene's indexing capabilities to operate independent of an underlying file format. Text from PDFs, HTML, Microsoft Word, and open source document formats, etc., may be indexed so long as their textual information can be extracted. Other indexing models and applications also exist and may similarly be utilized for the underlying indexing capabilities.

In the following description, numerous specific details are set forth such as examples of specific systems, languages, components, etc., in order to provide a thorough understanding of the various embodiments. It will be apparent, however, to one skilled in the art that these specific details need not be employed to practice the disclosed embodiments. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to a system or apparatus for performing the operations herein. The disclosed system or apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing non-transitory electronic instructions, each coupled to a computer system bus. In one embodiment, a computer readable storage medium having instructions stored thereon, causes one or more processors within a multi-tenant database environment to perform the methods and operations which are described herein. In another embodiment, the instructions to perform such methods and operations are stored upon a non-transitory computer readable medium for later execution.

The algorithms and displays presented herein are not inherently related to any particular computer or other apparatus nor are embodiments described with reference to any particular programming language. It will be appreciated that a variety of programming languages may be used to implement the teachings of the embodiments as described herein.

FIG. 1 illustrates an exemplary architecture 100 in which embodiments may operate. Architecture 100 depicts a partition manager 135 providing functionality for partitioning search indexes. Also depicted is a search index 115 and two partitioned search indexes 120A and 120B respectively.

In one embodiment, partition manager 135 identifies a search index 115 to be partitioned. The search index 115 includes a plurality of entity types. For example, the search index 115 provides indexing for, or indexes, multiple entity types, which correspond to various categories or enumerated varieties of data. For example, such entity types may represent categories of data such as "sales leads," "contacts," "purchase orders," "Build of Materials (BOMs)," "delivery commitments," "financing agreements," "contracts," and so forth. Some commonly used entity types may be provided by default, while other entity types may be custom entity types that are created and specified by a particular user.

Search index 115 as well as partitioned search indexes 120A and 120B associate each of the plurality of entity types with records (e.g., data base entries/rows, files, documents, objects, etc.) stored within a data store 130. In one embodiment, search index 115 provides indexing for several entity types and partitioning scheme 105 associates each of the various entity types with the search index 115. In one embodiment, search index 115 provides indexing for all of the available entity types that correspond to records stored within the data store 130.

In one embodiment, partition manager 135 partitions the search index 115 into a first partitioned search index 120A and a second partitioned search index 120B. The downward angled dashed arrows from search index 115 to each of the partitioned search indexes 120 depict that search index 115 is being partitioned (e.g., split, divided, etc.). In such an embodiment, partitioning scheme 105 correlates a first subset of the plurality of entity types with the first partitioned search index 120A and further correlates a second subset of the plurality of entity types with the second partitioned search index 120B.

Partitioning scheme 105 is depicted within FIG. 1 as correlating entity types 110A, 110B, 110C, and 110D with the partitioned search indexes 120A and 120B, as represented by the curved downward pointing arrows. More particularly, entity types 110A and 110B are depicted as being indexed by or within a first subset, and are correlated by partitioning scheme 105 to partitioned search index 120A. Entity types 110C and 110D are depicted as being indexed by or within a second subset, and are correlated by partitioning scheme 105 to partitioned search index 120B. In such an embodiment, each of the first and second subsets are non-overlapping, and the sum of the first and the second subsets constitute all of the entity types previously correlated or associated with search index 115 prior to its being partitioned.

Search index 115 is depicted with a dashed line to indicate that it has been partitioned into partitioned search indexes 120A and 120B. Thus, in one embodiment, the indexing information previously provided by search index 115 to provide indexing capabilities for data store 130 is inherited or taken over by partitioned search indexes 120A and 120B which, in such an embodiment, provide indexing for entity types 110A-D previously indexed by search index 115.

In one embodiment, partitioning scheme 105 correlates all available entity types 110A-D with search index 115, and then responsive to the partitioning of search index 115 into partitioned search indexes 120A and 120B, partitioning scheme 105 is revised, updated, or modified to reflect the new correlations in which a first subset of the entity types 110A-D is correlated to partitioned search index 120A and a second subset to partitioned search index 120B. In an alternative embodiment, search index 115 has no partitioning scheme providing entity type correlation because it indexes all available entity types 110 for the data store 130.

For example, prior to partitioning, search index 115 provides indexing capabilities for data store 130. Rather than searching the data store 130 itself, search index 115 may be searched based on a particular entity type 110A-D. For example, searching for entity type 110A within search index 115 may yield, as a result, references, pointers, links, etc., to records, (e.g., documents, entries, objects, or files) within the actual data store 130. Thus, the record or records of interest may be retrieved from the data store 130 without having to search the data store 130 for records matching the desired entity type to be searched (such as 110A as noted above). The right pointing horizontal dashed arrow indicates that, prior to being partitioned, search index 115 provides such links, references, pointers, etc., to records within data store 130.

In one embodiment, once partitioned, search index 115 no longer provides those links or references to the data store 130 via indexing. Instead, partitioned search indexes 120A and 120B provide these references. However, due to the partitioning and correlation, each provides indexing for only a subset of the plurality of entity types represented within the data store 130. Thus, a search request, specifying for example entity type 110A, would determine based on the partitioning scheme that partitioned search index 120A provides indexing of the data store 130 for entity type 110A, and then searching partitioned search index 120A results in pointers, links, references, etc., to data store 130, as is depicted by FIG. 1. Similarly, a search request specifying for example entity type 110D, would determine based on the partitioning scheme that partitioned search index 120B provides indexing of the data store 130 for entity type 110D, and then searching partitioned search index 120B for entity type 110D results in pointers, links, references, etc., to data store 130. In this way, the work of indexing can be broken up by entity type, regardless of how large or how much data the underlying data store 130 stores.

Figure 2:
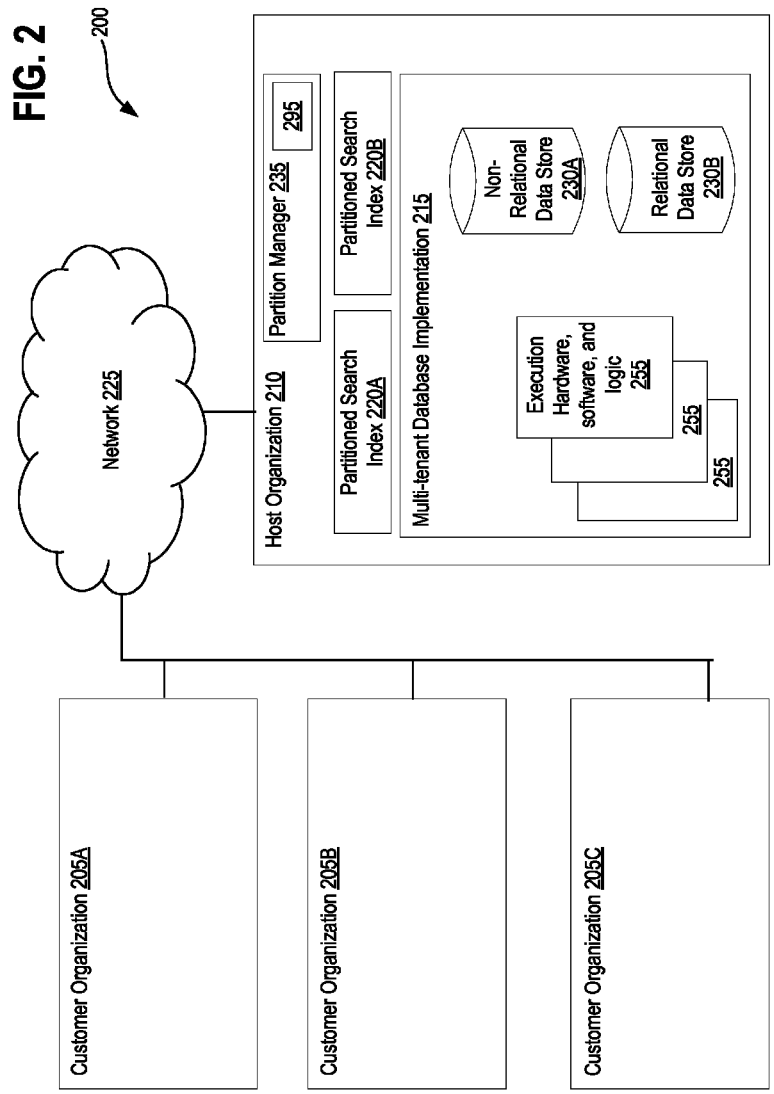
FIG. 2 illustrates an alternative exemplary architecture in which embodiments may operate.

FIG. 2 illustrates an alternative exemplary architecture 200 in which embodiments may operate. In one embodiment, partition manager 235 may operate within a host organization 210 that provides cloud computing services and data storage infrastructure via a multi-tenant database implementation 215. In such an embodiment, the host organization 210 provides the multi-tenant database implementation 215 in which a plurality of underlying hardware, software, and logic elements 255 implement database functionality and a code execution environment within the host organization 210 and in which the hardware, software, and logic elements 255 of the multi-tenant database implementation 215 are separate and distinct from a plurality of customer organizations (205A, 205B, and 205C) which utilize the services provided by the host organization 210 by communicably interfacing to the host organization 210 via network 225. In such an embodiment, each of the separate and distinct customer organizations (205A-205C) may be remotely located from the host organization 210 having the multi-tenant database implementation 215 executing therein. Alternatively, one or more of the customer organizations 205A-C may be co-located with the host organization 210 providing the multi-tenant database implementation 215 upon which underlying data is persistently stored.

In one embodiment, the hardware, software, and logic elements 255 of the multi-tenant database implementation 215 include at least a non-relational data store 230A and a relational data store 230B, which operate in accordance with the hardware, software, and logic elements 255 that implement the database functionality and code execution environment. In an alternative embodiment, multi-tenant database implementation 215 may include only a relational data store or only a non-relational data store, or alternatively, in some embodiments, the data store (e.g., 230A and 230B) may correspond to a single-tenant database implementation having its hardware and software dedicated to a single customer organization rather than shared amongst them.

In one embodiment, the multi-tenant database implementation 215 stores a plurality of data elements in which a first portion of the plurality of data elements resides within a non-relational data store 230A of the multi-tenant database implementation 215 and a second portion of the plurality of data elements resides within a relational data store 230B of the multi-tenant database implementation, thus, a search of an index or partitioned search index 220A and 220B may result in links, pointers, and references to one or both of the non-relational 230A and relational 230B type data stores. Resolution of such links, pointers, and references may alternatively be resolved via an interface into the multi-tenant database implementation 215.

In one embodiment, the partition manager 235 associates each of a plurality of entity types (such as 110A, 110B, 110C, and 110D of FIG. 1) with a primary key uniquely identifying each of the respective entity types 110A-D among the first partitioned search index 220A and the second partitioned search index 220B. In one embodiment, the primary key for each of the plurality of entity types is stored by or within partitioning scheme 295. In one embodiment, the primary key for each of the plurality of entity types 110A-D has a format consisting of a numeric primary key (e.g., 1111, 1234, 9876, etc.), an alphanumeric primary key (x0001, a00123, a23f7), or a binary primary key (0101, 0011, 1100, 1010, 010101, etc.).

Figure 3:
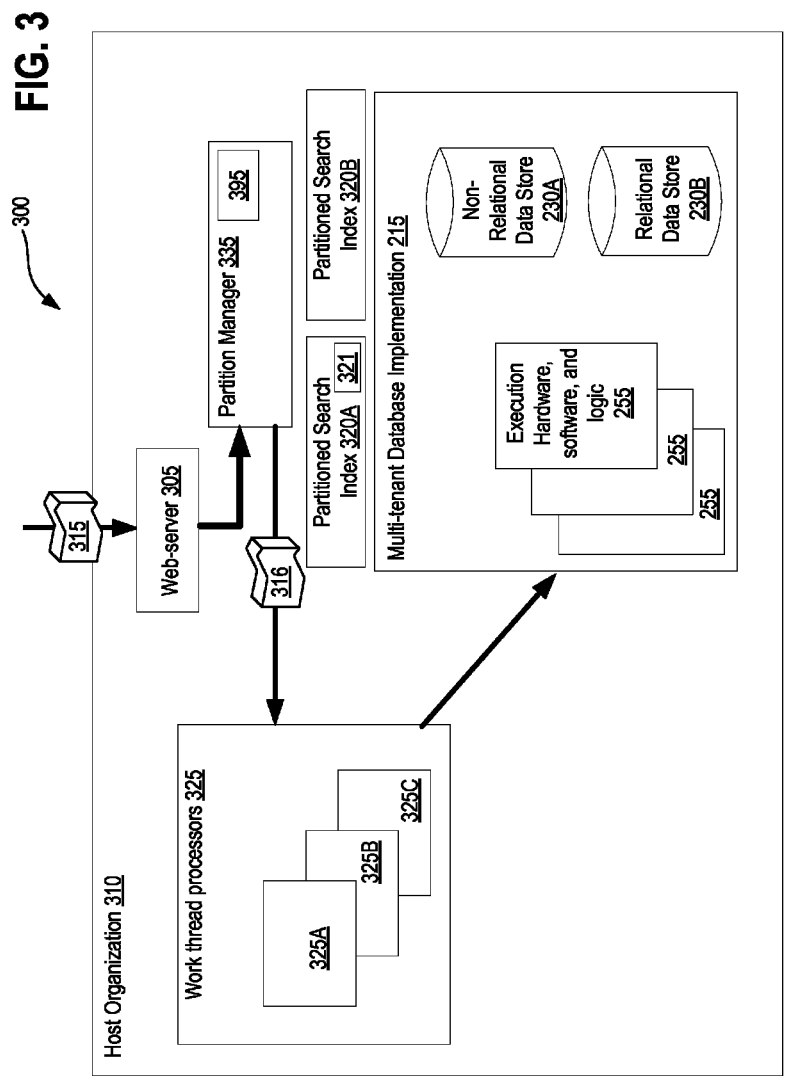
FIG. 3 illustrates an alternative exemplary architecture in which embodiments may operate.

FIG. 3 illustrates an alternative exemplary architecture 300 in which embodiments may operate.

In one embodiment, a search request 315 is received specifying an entity type to search. For example, search request 315 may be received at host organization 310 via web-server 305. In such an embodiment, the entity type may be specified within the received search request 315, such as in the form of a string, a numeric or alphanumeric, or binary value, which may correspond to or express a primary key for the entity type to be searched. Alternatively, multiple entity types may be specified via search request 315.

In one embodiment, web-server 305 receives the search request 315 from an end-user client machine (e.g., such as a client device located at one of customer organizations 205A through 205C) and then web-server 305 extracts or correlates the specified entity type from the search request. In one embodiment, web-server 305 determines an entity type for the search request 315 based on a user identifier UserID or an organization identifier OrgID associated with the search request 315. For example, the requesting entity may be a small organization having only a single entity type for its data in which the entity type correlates 1:1 with its OrgID. Conversely, larger organizations may have several enumerated entity types, common examples of which may include, for example, accounts, contacts, sales leads, etc., or geographical based entity types such as NE region, SW region, Central region, and so forth, or organization entity types such as by division, work group, unit, department, and so forth. Customers and users may also define a custom or category of data or record type for use as a specified entity type.

Based on a received search request 315, partition manager 335 may select either a first partitioned search index 320A or a second partitioned search index 320B based on the specified entity type to search and based further on a partitioning scheme 395 correlating each of a plurality of entity types with the respective first or second partitioned search index (e.g., 320A and 320B).

In one embodiment, partition manager 335 then initiates searching either the first partitioned search index 320A or the second partitioned search index 320B based on the selection. For example, in one embodiment, partition manager 335 receives the search request from the web-server 305, makes a selection of the available partitioned search indexes 320A or 320B to search, and then initiates a search of the selected search index 320A or 320B by sending a search request to one of a plurality of work thread processors (e.g., 325A, 325B, and 325C) or to a bank of work thread processors 325, to implement the requested search. For example, partition manager 335 may send a request 316 to the bank of work thread processors 325 to implement the above search. The bank of work thread processors may then implement the appropriate search upon the data store (e.g., non-relational data store 230A and/or relational data store 230B) via the plurality of execution hardware, software, and logic elements 255 of multi-tenant database implementation 215.

In one embodiment, partitioning scheme 395 includes a listing of a plurality of partitioned search indexes (e.g., 320A and 320B), including at least the first partitioned search index 320A and the second partitioned search index 320B. In one embodiment, partitioning scheme 395 associates each of the plurality of partitioned search indexes listed (e.g., 320A and 320B) with one or more of the plurality of entity types in non-overlapping subsets of entity types. For example, in such an embodiment, any one of the plurality of entity types listed is associated with no more than one of the plurality of partitioned search indexes listed (e.g., 320A and 320B). Thus, if entity types "A" "B" "C" and "D" are listed, a non-overlapping association may reflect entity types "A" and "B" being associated with partitioned search index 320A only and not 320B, and entity types "C" and "D" being associated with partitioned search index 320B only and not 320A, thus, no overlap of the entity types is present.

Further still, in such an embodiment, all of the plurality of entity types are associated with one, and at most one, of the plurality of partitioned search indexes listed. Thus, no entity type is left un-associated, which may cause a search result of the known indexes to falsely return no search results for a valid entity type having valid entries and records in the data stores 230A and 230B. For example, taking the example above of specified entity types "A" "B" "C" and "D," each of the entity types is affirmatively associated with at least one of the partitioned search indexes listed (e.g., 320A and 320B) by partitioning scheme 395.

In one embodiment, a first partitioned search index (e.g., 320B) is a shared partitioned search index, in which the shared partitioned search index is associated, via the partitioning scheme 395, with two or more of the plurality of entity types.

In one embodiment, data stores 230A and 230B are maintained during a transitional phase during which pre-existing data exists within the data stores 230A and 230B in a non-partitioned state and new data or updated/modified data is, by default, integrated into the partitioned scheme described herein, and allocated to or associated with a partitioned search index (e.g., 320A or 320B). For example, all new customer data may be assigned to either a dedicated partition or to a shared partition based on size of the new customer data to be integrated or stored within data stores 230A and 230B. A dedicated partition is a partition that is associated with only a single entity type, whereas a shared partition is a partition that is provides indexing for, and is thus associated with, multiple entity types, as is described in additional detail below.

In one embodiment, the pre-existing data that is yet to be partitioned during such a transitional phase is scheduled for transition to the partitioned scheme to be managed by the partition manager 335. For example, at some point, a re-synchronization can be forced, re-indexing all the data in the entire database. Alternatively, specified portions can be forced into a re-synchronization thus causing a re-indexing by, for example, triggering all data for a particular OrgID to be re-indexed, causing the data corresponding to that OrgID to be refreshed by writing the existing data into the partitioned scheme and then deleting the corresponding unorganized and un-partitioned records from the non-partitioned search indexes. One OrgID after another may be processed in such a way, in a controlled manner in the background to limit consumption of computational bandwidth of the multi-tenant database implementation 215. In this way, a perceptible degradation in performance may be avoided, until all data in the data stores 230A and 230B are completely refreshed and converted over to the partitioned scheme.

In one embodiment, every OrgID or user entity of the multi-tenant database implementation 215 is initially associated with a single shared partition that provides indexing capabilities for all of the entity types utilized by that OrgID. In such an embodiment, an entity type for a particular OrgID that grows to exceed the maximum size threshold can then be promoted to a dedicated partition, leaving the remaining entity types for that OrgID still associated with the shared partition. In an alternative embodiment, a dedicated partition is instead initially allocated to every entity type of every OrgID of the multi-tenant database. However, such a policy may cause a proliferation of very small (and sub-optimal in size) dedicated search index partitions, each with very little data. Such proliferation of small dedicated partitions may then lead to an excessive amount of computational overhead to manage the large number of dedicated partitions, thus detracting from the benefits of the disclosed partitioning scheme and methodologies.

Accordingly, entity types associated with a small amount of data below a determined size threshold, may be kept together in shared partitions, each shared partition being associated with more than one specified entity type in accordance with the partitioning scheme 395 as managed by the partition manager 335.

In one embodiment, the following partition rules for "shared" partitions may be explicitly implemented:

Rule 1: Each entity type can only be in at most 1× shared partition;

Rule 2: Each entity is in either a shared partition —OR— in its own partition if that entity has greater than (>) a specified size threshold (e.g., 500 mb of data on disk or another amount based on the optimal tuning and sizing of a search index for the search index application utilized).

Rule 3: A small entity is any entity associated with a partitioned search index consuming less than the specified size threshold.

Rule 4: All new entities start in a shared partitions as a small entity consuming a size of zero at initialization (e.g., by definition, less than the specified size threshold), subsequent to which, indexing of information within the data stores 230A and 230B causes the size of the small entity's associated shared partition to increase in size.

Rule 5: When a small entity within a shared partition exceeds the specified size threshold, the small entity is promoted to a dedicated partition, also referred to as a dedicated search index.

Thus, in accordance with one embodiment, a first partitioned search index (e.g., 320A) is a dedicated search index, in which the dedicated search index associated, via the partitioning scheme 395, with no more than one of the plurality of entity types. In a particular embodiment, partition manager 335 allocates a primary key 321 to the one entity type associated with the dedicated search index, in which the primary key 321 uniquely identifies the one entity within the dedicated partitioned search index type among the first partitioned search index 320A and the second partitioned search index 320B, or among all listed partitioned search indexes via partitioning scheme 395.

In one embodiment, allocating the primary key 321 for the dedicated partitioned search index (e.g., 320A in this example) includes the following operations: 1) executing a hash function against a string label identifying the one entity type associated with the dedicated search index (e.g., 320A) to generate a binary string, and 2) allocating the binary string as the primary key 321 for the one entity type associated with the dedicated search index (e.g., 320A).

In one embodiment, the partition manager 335, subsequent to allocating a primary key 321 to the one entity type associated with a dedicated search index (e.g., allocating one of a numeric primary key, an alphanumeric primary key, or a binary primary key to the one entity type) further performs the following operations: 1) creates a new named sub-directory for the dedicated search index, 2) names the new named sub-directory to match the value of the allocated primary key 321, and 3) stores the dedicated search index within the new named sub-directory.

In one embodiment, the dedicated search index (e.g., 320A) is locatable within a hierarchical directory structure of a file system based upon its primary key 321, in which the primary key 321 corresponds to a named sub-directory within the hierarchical directory structure, and further in which the dedicated search index (e.g., 320A) resides upon the file system within the named sub-directory. For example, a primary key 321 having a string value of "accounts" may be generated for the dedicated partition in which a corresponding sub-directory is also named "accounts" or at least partially contains the name "accounts." Another example is a binary primary key having a value of "0011" and in which the sub-directory name beings with a corresponding "0011," the sub-directory containing therein the appropriate file system file embodying the actual dedicated search index (e.g., 320A or 320B) to be searched. Yet another example is an automatically generated primary key 321 having an alphanumeric value of "x0001" which corresponds directly to a sub-directory name within a file system, the sub-directory containing the searchable dedicated search index (e.g., 320A or 320B).

In one embodiment, partition manager 335, responsive to receiving a search request 315 specifying an entity type to search, determines the primary key 321 allocated to the specified entity type from the partitioning scheme 395, and then the partition manager 335 further identifies named sub-directory within the file system based on a comparison of the determined primary key 321 against a plurality of named sub-directories within the file system, in which each of the plurality of named sub-directories have a corresponding partitioned search index (regardless of whether the search index is shared or dedicated) stored therein, internal to or as a file of the respectively identified sub-directory. In such an embodiment, partition manager 335 further searches the dedicated search index or shared search index within the identified named sub-directory based on the identification. For example, by initiating search of the data store 230A and 230B via the bank of work thread processors 325.

In one embodiment, partition manager 335, responsive to receiving a search request 315 specifying an entity type to search, executes a hash function against the specified entity type to search to generate a corresponding binary string for the specified entity type to search, and then the partition manager 335 further identifies the named sub-directory within the file system based on a comparison of the corresponding binary string against a plurality of named sub-directories within the file system, each of the plurality of named sub-directories having a partitioned search index (e.g., 320A or 320B) stored therein, and in which each of the plurality of named sub-directories are named with a binary string corresponding to an entity type associated with the partitioned search index stored within the named sub-directory. In such an embodiment, the partition manager 335 further initiates searching of a dedicated search index within the identified named sub-directory based on the identification of the corresponding binary string through the above execution of the hash function.

In some embodiments, a tree structure having multiple nodes is utilized to store and organize the partitioned search indexes. Thus, in accordance with a particular embodiment, correlating a first subset of the plurality of entity types with a first partitioned search index (e.g., 320A) and correlating a second subset of the plurality of entity types with the second partitioned search index (320B) includes modifying a tree or tree structure within the partitioning scheme 395. For example, in such an embodiment, the tree includes a plurality of nodes organized according to binary strings associated with the nodes, and each of the plurality of nodes have or are associated with a binary string having one or more significant digits in binary form. In such an embodiment, modifying the tree within the partitioning scheme 395 includes the following operations: 1) replacing one of the plurality of nodes corresponding to a search index with two new nodes, including a first new node corresponding to the first partitioned search index (e.g., 320A) and a second new node corresponding to the second partitioned search index (e.g., 320B); 2) assigning the binary string of the replaced node to the first new node (e.g., 320A); 3) adding a significant digit to the binary string of the first new node with a "0" binary value; 4) allocating the entity types of the first subset of entity types to the first new node (e.g., corresponding to 320A); 5) assigning the binary string of the replaced node (e.g., corresponding to the original search index being partitioned) to the second new node; 6) adding a significant digit to the binary string of the second new node with a "1" binary value; and 7) allocating the entity types of the second subset of entity types to the second new node (e.g., corresponding to 320B).

In embodiments utilizing a tree having nodes, hashing may again be implemented for correlating, generating, and assigning keys or search strings against existing keys. Thus, in accordance with a particular embodiment, partition manager 335 receives a search request 315 specifying an entity type to search and responsively executes a hash function against the specified entity type to search to generate a corresponding binary string for the specified entity type to search. In such an embodiment, the partition manager further compares the correspondingly generated binary string for the specified entity type against the significant digits of the plurality of nodes in the tree until a single matching node is identified based on the binary string of the identified node. Finally, the partition manager 335 initiates searching of an index within the identified node of the tree. In an alternative embodiment, the partition manager 335 looks up the primary key 321 based on the specified entity type within the search request 315, to obtain a corresponding binary key.

This type of hashing may be referred to as "consistent hashing" because each time a string is processed through the hashing algorithm or though a hardwarized hashing module, a "consistent" hash, such as a binary string or alphanumeric string is identically generated, every time. Thus, the mapping of entity type to partition (e.g., tree node) may be kept consistent.

To further illustrate the above tree example, consider that a "root" node may, for example, be split into nodes identified as 0xxx and 1xxx in which the "0" of "0xxx" represents a single significant digit and the "1" of the "1xxx" node represents a single significant digit. In this example, the "root" node contains all entity types while each of the split nodes "0xxx" and "1xxx" provide association of a subset of entity types to a corresponding partitioned search index. For example, entity type string such as "Account" may hash to a binary string having '0' or '1' respectively in the first significant digit, and can thus be correlated to either the "1xxx" or "0xxx" node based on the resulting hash. The "x" in these examples merely represents a non-significant or unreferenced digit. Although each node may have other binary "0s" and "1s" in non-significant digit positions beyond the initial single significant digit, the trailing digits are not required to uniquely identify either the "0xxx" node or the "1xxx" node. Root/0xxx and Root/1xxx may then split to Root/00xx, Root/01xx, Root/10xx, and Root/11xx. Notably, each node now reflects two significant digits, thus allowing four distinctly identifiable nodes, each associating a subset of entity types to partitioned search indexes. An alternative view of the same four nodes may be:

00xx
    01xx
    10xx
    11xx

Accordingly, a binary hash value with 0101101010101, for example, may be applied to the non-split "0xxx" and "1xxx" nodes by looking at only the single leading "0" and thus identifying the "0xxx" node as the node to search. With reference to the split nodes corresponding to Root/00xx, Root/01xx, Root/10xx, and Root/11xx from the example above, the binary hash value may be applied to the split nodes by referencing both the left most digit "0" and further referencing the second to left most digit, which is "1" in the above binary hash value (e.g., two significant digits) and thus identifying the "01xx" node as the node or partitioned search index to search. This node, identified as "01xx," which is the end location or the "leaf" partition, is the node in which the key prefix belongs, as corresponded by the consistent hash algorithm.

In one embodiment, the roots or root nodes in the example above are deleted, resulting in only leaf or node partitions that actually store data remaining in the tree. Thus, in such an embodiment, there are no intermediary pointers or intermediate nodes, as each remaining node is uniquely identifiable and can be located through consistent hashing as described above.

As an alternative to utilizing hashing techniques, each entity type, pre-determined or custom created, may be allocated a specified binary string, which is then later referenced or correlated to perform the necessary node identification. For example, the entity type "sales" may be allocated a binary string of "001" as its primary key 321 and "accounts" may be allocated the binary string of "011" as its primary key 321. The node identification may then be performed as set forth above. Such an allocation scheme may also be utilized with respect to the use of sub-directories within a file system.

In one embodiment, partition manager 335 identifies a search index (e.g., 320A) to be partitioned into multiple partitioned search indexes. In accordance with such an embodiment, identifying a search index to be partitioned includes the following operations: 1) determining a size of the search index to be partitioned (e.g., such as a storage size on disk or alternatively a size by number of references, links, or pointers internal to the search index or by another measure); 2) comparing the size against a size threshold; 3) determining that the size exceeds the size threshold; and 4) initiating partitioning for the search index to be partitioned based on the determination that the search index exceeds the size threshold.

In one embodiment, partitioning a search index into a first partitioned search index and a second partitioned search index (such as splitting a search index into partitioned search indexes 320A and 320B respectively) includes the following operations: 1) allocating one or more of a plurality of entity types associated with the search index to the first partitioned search index (e.g., 320A); 2) allocating a remaining portion of the plurality of entity types which are not allocated to the first partitioned search index to the second partitioned search index (e.g., 320B); and partitioning the search index into the first partitioned search index 320A and the second partitioned search index 320B in accordance with the allocations. In such an embodiment, the allocations may be listed or coordinated by partitioning scheme 395.

In an alternative embodiment, partitioning a search index into the first partitioned search index 320A and the second partitioned search index 320B includes the following operations: 1) cloning the search index in its entirety to create a first search index clone and a second search index clone (e.g., two same copies of the original search index); 2) deleting all entity types within a first subset of the plurality of entity types from the second search index clone, according to an allocation specified by the partitioning manager 335; 3) deleting all entity types within the second subset of the plurality of entity types from the first search index clone according to the allocation specified by the partitioning manager 335; 4) designating the first search index clone as the first partitioned search index 320A; designating the second search index clone as the second partitioned search index 320B; and updating the partitioning scheme 395 in accordance with the partitioning (e.g., recording the allocation specified by the partition manager 335 into the partitioning scheme 395).

In some situations, partitioning or splitting a search index into multiple partitioned search indexes (e.g., 320A and 320B) will result in a partitioned search index retaining its status as a "shared" search index, while at the same time, owing to the partitioning, the "shared" partitioned search index may have only a single entity type associated with it. This is not a problem, but rather, it is a natural progression of a "shared" search index organically growing into a "dedicated" search index. Thus, in accordance with one embodiment, the partition manager 335 determines that the first partitioned search index (e.g., 320A) correlates to only one entity type based on the partitioning scheme 395, subsequent to a partitioning event. The partition manager therefore promotes the first partitioned search index 320A to a dedicated search index associated with only the one entity type based on the partitioning scheme.

Another situation may result in which a dedicated search index grows to exceed the determined size threshold for search indexes or partitioned search indexes. Similarly, this is not a problem. When a dedicated search index becomes so large in size that it exceeds the size threshold, a new empty dedicated search partition is added, and new data is written to the new empty dedicated search partition. Data that is updated may be either updated in the original dedicated partition or may be updated by writing the updated data into the new partition and deleting the old corresponding data from the original partition. Thus, in accordance with a particular embodiment, the partition manager 335 determines that a first dedicated search index (e.g., 320A) exceeds a size threshold and responsively adds a new second dedicated search index (e.g., 320B) that provides indexing for the same one entity type as the first dedicated search index (e.g., 320A) resulting in each of the first dedicated search index and the second dedicated search index being associated with the one entity type based on the partitioning scheme 395, and further wherein the one entity type is only associated with the first dedicated search index and the second dedicated search index based on the partitioning scheme 395. Such a situation may occur when, for example, a single customer, organization, or entity has a large amount of data in a data store associated with one particular entity type, and the corresponding search indexes correspondingly grow to be large in size due to the indexing of the data in the data store, until a dedicated partition for that entity type exceeds the size threshold. Although introducing a new second dedicated search index may require searching both the first and second dedicated search indexes for a particular entity type, maintaining an optimal size for the search indexes may outweigh the additional computational costs of having to search both related first and second dedicated search index for that entity type.

Figure 4:
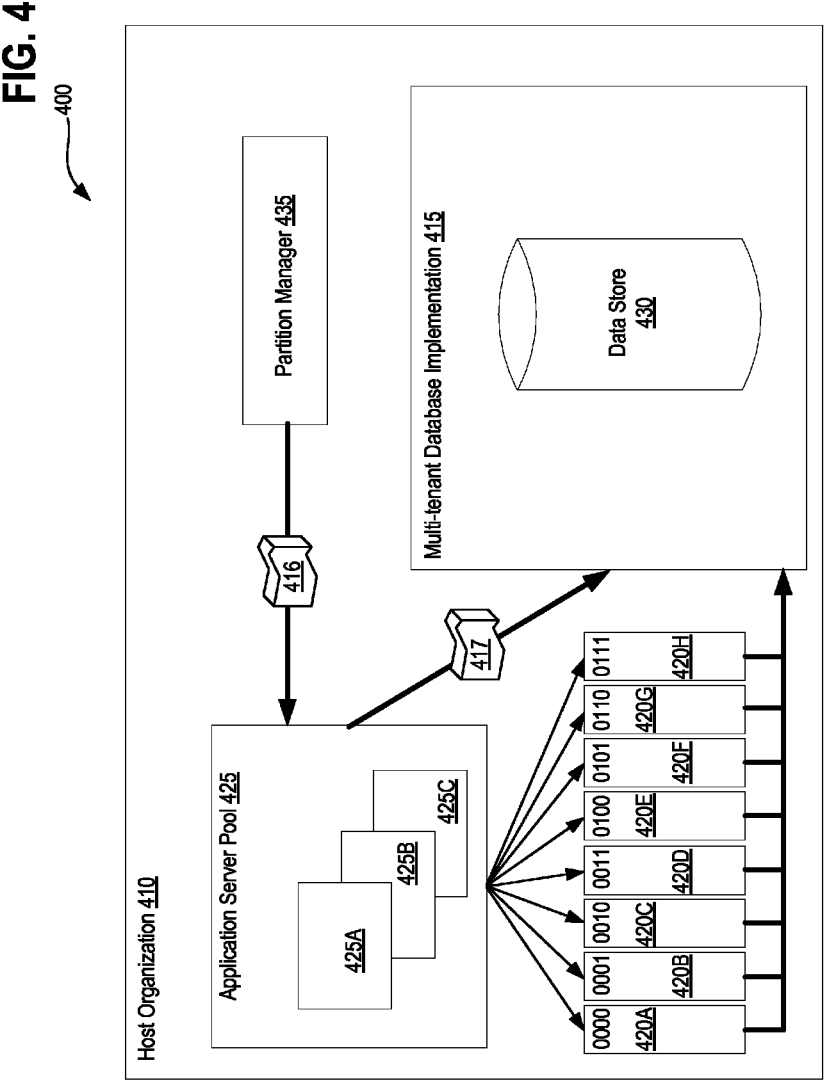
FIG. 4 illustrates an alternative exemplary architecture in which embodiments may operate.

FIG. 4 illustrates an alternative exemplary architecture 400 in which embodiments may operate. In particular, FIG. 4 depicts each of the several partitioned search indexes as partitioned search indexes 420A, 420B, 420C, 420D, 420E, 420F, 420G, and 420H, each of which correspond to identifiable primary keys, exemplified at the top of each of the partitioned search indexes 420A to 420H as "0000" "0001" "0010" "0011" "0100" "0101" "0110" and "0111" respectively. Each of the partitioned search indexes 420A to 420H may have one primary key (e.g., a dedicated partitioned search index) or multiple primary keys (e.g., a shared partitioned search index) allocated or associated with each of the individual partitioned search indexes 420A to 420H per a partitioning scheme (e.g., 395).

In accordance with one embodiment, the partition manager 435 initiating searches 416 on the basis of a specified entity type may have the multiple searches parallelized by an application server pool 425 within a host organization 410. For example, because each of the several partitioned search indexes 420A to 420H correspond to identifiable primary keys, the individual application servers (425A, 425B, and 425C) within the application server pool 425 can break up and execute multiple searches in parallel by directing various searches only to the appropriate partitioned search indexes 420A through 420H associated with a particular entity type (via its primary key) without having to search all of the various partitioned search indexes 420A through 420H available to the system. Once a resulting record or record set is identified on the basis of searching the appropriately identified partitioned search index (e.g., one of 420A through 420H) the pertinent information can then be retrieved from the data store 430 within the multi-tenant database implementation 415. Thus, not only does the use of the search indexes save computational resources, and thus improve responsiveness of the implementing system, but partitioning in such a way greatly reduces the number (potentially to only one) of search indexes that must be searched, even when searching an extremely large data repository.

In one embodiment, a global caching layer is provided that is referenceable by the partition manager 435 and the application servers 425A-C of the application server pool 425 should look-ups need to be performed to correlate specified entity types to primary keys corresponding to the various partitioned search indexes 420A-H.

During a transitionary period, for example, during a period of time when the disclosed partitioning techniques are being implemented onto an already existing data store, it may nevertheless be necessary for the application servers 425A-C to reference multiple unorganized search indexes having search data spread across them or perform traditional searches against the data store 430 without the benefit of utilizing a search index. In such a transitionary period, a fall back query path 417 may be provided to the application server pool 425 or its application servers 425A-C so that such fall back queries may be performed, where the required data is not yet refreshed or re-synchronized into the partitioned search index scheme and under the management of the partition manager 435. Once resynchronization is completed, the fall back query path 417, should not be required, but may nevertheless maintained as a fall back or as an alternate query path.

Figure 5:
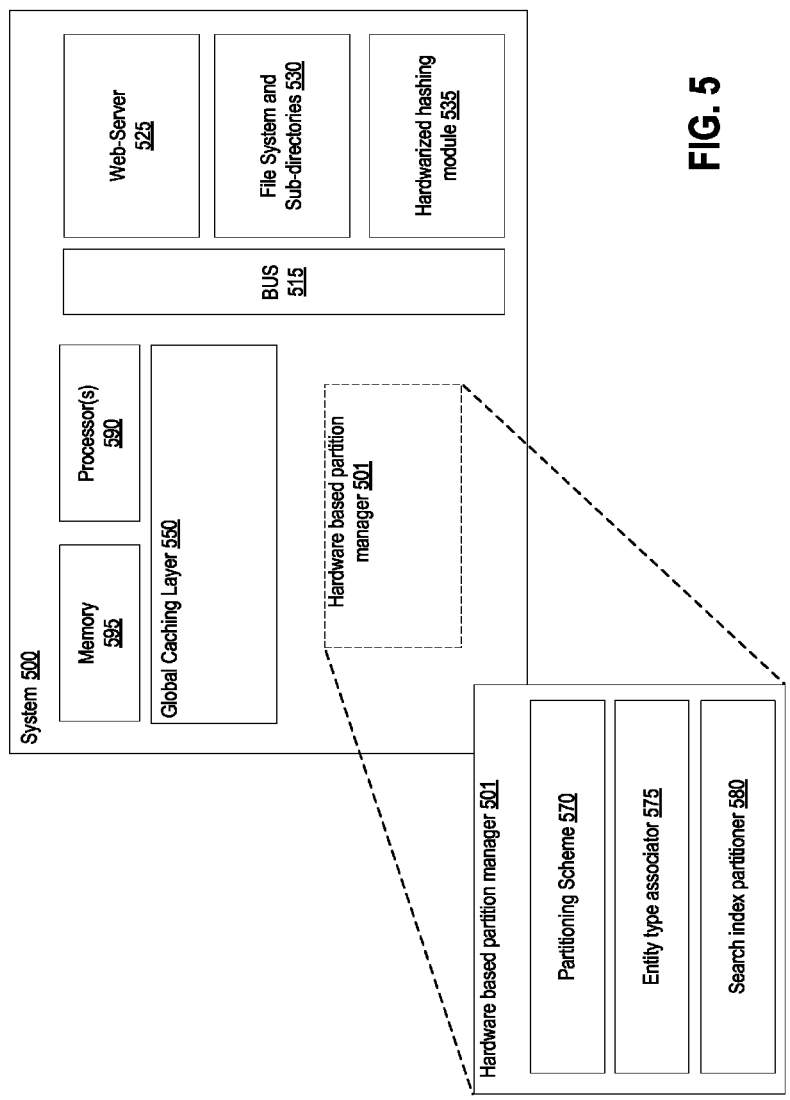
FIG. 5 shows a diagrammatic representation of a system in which embodiments may operate, be installed, integrated, or configured.

FIG. 5 shows a diagrammatic representation of a system 500 in which embodiments may operate, be installed, integrated, or configured.

In one embodiment, system 500 includes a memory 595 and a processor or processors 590. For example, memory 595 may store instructions to be executed and processor(s) 590 may execute such instructions. System 500 includes bus 515 to transfer transactions and data within system 500 among a plurality of peripheral devices communicably interfaced with bus 515. System 500 further includes a global caching layer 550 to provide caching services to communicably interfaced devices and systems and in particular, provide caching of primary keys and correlation information (e.g., meta data, etc.) between specified entity types to be searched and keys or primary keys associated with partitioned search indexes. System 500 further includes web-server 525, for example, to receive requests, return responses, and otherwise interface with remote clients, such as client devices located within customer organizations 205A-C.

System 500 is further depicted as having a hardwarized hashing module 535 to apply a consistent hashing algorithm against strings and to generate or correlate entity type strings to binary or alphanumeric primary keys for the partitioned search indexes. In accordance with one embodiment, the hardwarized hashing module 535 is to perform consistent hashing against string identifiers for the plurality of entity types to generate binary strings as an output of the hashing module, wherein the binary strings generated by the hardwarized hashing module 535 are allocated to the plurality of entity types as primary keys, and wherein the binary strings generated by the hardwarized hashing module 535 are further used to locate corresponding search indexes including shared, dedicated, and other partitioned search indexes.

System 500 further includes a file system and sub-directories 530 within which partitioned search indexes may be organized and stored (e.g., upon a hard drive, persistent data store or other storage location for storing the partitioned search indexes).

Distinct within system 500 is a hardware based partition manager 501 which includes partitioning scheme 570, entity type associator 575, and search index partitioner 580. In accordance with one embodiment, partitioning scheme 570 specifies or associates which of a plurality of entity types are associated with each of a plurality of partitioned search indexes communicably interfaced with or stored within system 500. Entity type associator 575 groups, sub-divides, and specifies which entity types are to be associated with a given search index that is being partitioned and entity type associator 575 further implements the designated associations into partitioning scheme 570. Search index partitioner 580 provides partitioning services of search indexes including identifying search indexes to be partitioned, cloning and copying search indexes, deleting records from search indexes which are no longer associated with a specified entity type due to a partitioning event, determining size on disk or number of references within a search index to potentially be partitioned, comparing determined sizes against a specified size threshold, etc., in accordance with the methodologies previously described.

FIG. 6 is a flow diagram illustrating a method 600 for partitioning search indexes in accordance with one embodiment, including partitioning search indexes and managing and searching partitioned search indexes in a single or multi-tenant database environment. Method 600 may be performed by processing logic that may include hardware (e.g., circuitry, dedicated logic, programmable logic, microcode, etc.), software (e.g., instructions run on a processing device to perform operations such as index searching, splitting, management, etc.), or a combination thereof. In one embodiment, method 600 is performed by hardware logic, such as the hardware based partition manager depicted at element 501 FIG. 5. Some of the blocks and/or operations listed below are optional in accordance with certain embodiments. The numbering of the blocks presented is for the sake of clarity and is not intended to prescribe an order of operations in which the various blocks must occur.

Method 600 begins with processing logic identifying a search index to be partitioned (block 605). At block 610, processing logic partitions the search index into a first partitioned search index and a second partitioned search index.

At block 615, processing logic correlates a first subset of the plurality of entity types with the first partitioned search index. At block 620, processing logic correlates a second subset of the plurality of entity types with the second partitioned search index.

At block 625, processing logic associates each of the plurality of entity types with a primary key uniquely identifying the respective entity type among the first partitioned search index and the second partitioned search index and at block 630, processing logic stores the primary key for each of the plurality of entity types within the partitioning scheme.

At block 635, processing logic promotes a first partitioned search index to a dedicated search index associated with only the one entity type based on the partitioning scheme.

At block 640, processing logic receives a search request specifying an entity type to search. At block 645, processing logic selects either the first partitioned search index or the second partitioned search index based on the specified entity type to search and based further on the partitioning scheme correlating each of the plurality of entity types with the respective first or second partitioned search index.

At block 650, processing logic searches either the first partitioned search index or the second partitioned search index based on the selection. At block 655, processing logic executes a hash function against a string label identifying the one entity type associated with the dedicated search index to generate a binary string. At block 660, processing logic allocates the binary string as the primary key for the one entity type associated with a dedicated search index.

FIG. 7 illustrates a diagrammatic representation of a machine 700 in the exemplary form of a computer system, in accordance with one embodiment, within which a set of instructions, for causing the machine 700 to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment or as a server or series of servers within an on-demand service environment, including an on-demand environment providing multi-tenant database storage services. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 700 includes a processor 702, a main memory 704 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 718 (e.g., a persistent storage device including hard disk drives and persistent multi-tenant data base implementations), which communicate with each other via a bus 730. Main memory 704 includes partitioning scheme 724 (e.g., specified associations between entity types and partitioned search indexes under the control of a partition manager) and global cache 723, such as a system-wide accessible global caching layer to provide metadata and other corresponding information between entity types and primary keys associated with partitioned search indexes operable in conjunction with processing logic 726 and processor 702 to perform the methodologies discussed herein.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 702 may also be one or more special-purpose processing devices such as an application specific integrated circuit (ASIC), a field programmable gate array (FPGA), a digital signal processor (DSP), network processor, or the like. Processor 702 is configured to execute the processing logic 726 for performing the operations and functionality which is discussed herein.

The computer system 700 may further include a network interface card 708. The computer system 700 also may include a user interface 710 (such as a video display unit, a liquid crystal display (LCD), or a cathode ray tube (CRT)), an alphanumeric input device 712 (e.g., a keyboard), a cursor control device 714 (e.g., a mouse), and a signal generation device 716 (e.g., an integrated speaker). The computer system 700 may further include peripheral device 736 (e.g., wireless or wired communication devices, memory devices, storage devices, audio processing devices, video processing devices, etc. The computer system 700 may further include a Hardware based partition manager 734 managing and partitioning partitioned search indexes and initiating searches against such partitioned search indexes.

The secondary memory 718 may include a non-transitory machine-readable storage medium (or more specifically a non-transitory machine-accessible storage medium) 731 on which is stored one or more sets of instructions (e.g., software 722) embodying any one or more of the methodologies or functions described herein. The software 722 may also reside, completely or at least partially, within the main memory 704 and/or within the processor 702 during execution thereof by the computer system 700, the main memory 704 and the processor 702 also constituting machine-readable storage media. The software 722 may further be transmitted or received over a network 720 via the network interface card 708.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method in a host organization having at least a processor and a memory therein, wherein the method comprises:
    identifying a shared search index to be partitioned based on the shared search index having grown in size to exceed a threshold, wherein the shared search index provides indexing for a plurality of entity types, each of the plurality of entity types associating records stored in a data store of the host organization with the respective entity type of the shared search index;
    partitioning, via the partition manager, the search index into a first partitioned search index and a second partitioned search index;
    correlating, via a partitioning scheme, a first subset of the plurality of entity types with the first partitioned search index;
    correlating, via the partitioning scheme, a second subset of the plurality of entity types with the second partitioned search index, wherein each of the first and second subsets are non-overlapping and wherein a sum of all entity types within the first and the second subsets constitute all of the entity types previously associated with the shared search index prior to its being partitioned;
    determining the first partitioned search index correlates to only one single entity type based on the partitioning scheme, subsequent to the partitioning; and
    promoting the first partitioned search index to a dedicated search index associated with the only one single entity type based on the partitioning scheme.

2. The method of claim 1, further comprising:
    associating each of the plurality of entity types with a primary key uniquely identifying the respective entity type among the first partitioned search index and the second partitioned search index; and
    storing the primary key for each of the plurality of entity types within the partitioning scheme.

3. The method of claim 2:
    wherein the primary key for each of the plurality of entity types comprises one of: a numeric primary key, an alphanumeric primary key, or a binary primary key; and
    wherein the method further comprises:
    receiving a search request specifying an entity type to search;
    selecting either the first partitioned search index or the second partitioned search index based on the specified entity type to search and based further on the partitioning scheme correlating each of the plurality of entity types with the respective first or second partitioned search index; and
    searching either the first partitioned search index or the second partitioned search index based on the selection.

4. The method of claim 3:
    wherein the partitioning scheme comprises a listing of a plurality of partitioned search indexes, including at least the first partitioned search index and the second partitioned search index;
    wherein the partitioning scheme associates each of the plurality of partitioned search indexes listed with one or more of the plurality of entity types in non-overlapping subsets of entity types;
    wherein any one of the plurality of entity types is associated with no more than one of the plurality of partitioned search indexes listed; and wherein all of the plurality of entity types are associated with one of the plurality of the plurality of partitioned search indexes listed.

5. The method of claim 3:
wherein the first partitioned search index comprises a shared partitioned search index, the shared partitioned search index associated, via the partitioning scheme, with two or more of the plurality of entity types.

6. The method of claim 1:
wherein the first partitioned search index comprises a dedicated search index, the dedicated search index associated, via the partitioning scheme, with no more than one of the plurality of entity types.

7. The method of claim 6, further comprising:
allocating a primary key to the one entity type associated with the dedicated search index, the primary key uniquely identifying the one entity type among the first partitioned search index and the second partitioned search index.

8. The method of claim 7, wherein allocating the primary key comprises:
executing a hash function against a string label identifying the one entity type associated with the dedicated search index to generate a binary string;
allocating the binary string as the primary key for the one entity type associated with the dedicated search index.

9. The method of claim 7, wherein the dedicated search index is locatable within a hierarchical directory structure of a file system based upon its primary key, the primary key corresponding to a named sub-directory within the hierarchical directory structure, and wherein the dedicated search index resides upon the file system within the named sub-directory.

10. The method of claim 9, further comprising:
receiving a search request specifying an entity type to search;
determining the primary key allocated to the specified entity type from the partitioning scheme;
identifying the named sub-directory within the file system based on a comparison of the determined primary key against a plurality of named sub-directories within the file system, each of the plurality of named sub-directories having a partitioned search index stored therein; and
searching the dedicated search index within the identified named sub-directory based on the identification.

11. The method of claim 9, further comprising:
receiving a search request specifying an entity type to search;
executing a hash function against the specified entity type to search to generate a corresponding binary string for the specified entity type to search;
identifying the named sub-directory within the file system based on a comparison of the corresponding binary string against a plurality of named sub-directories within the file system, each of the plurality of named sub-directories having a partitioned search index stored therein, and wherein each of the plurality of named sub-directories are named with a binary string corresponding to an entity type associated with the partitioned search index stored within the named sub-directory; and
searching the dedicated search index within the identified named sub-directory based on the identification.

12. The method of claim 9:
wherein allocating the primary key to the one entity type associated with the dedicated search index comprises allocating one of a numeric primary key, an alphanumeric primary key, or a binary primary key to the one entity type; and wherein the method further comprises:
creating a new named sub-directory for the dedicated search index;
naming the new named sub-directory to match the value of the allocated primary key; and
storing the dedicated search index within the new named sub-directory.

13. The method of claim 1, wherein the method further comprises:
identifying one of the first partitioned search index or the second partitioned search index to be a first dedicated search index and adding a new second dedicated search index that provides indexing for the same one entity type as the first dedicated search index resulting in each of the first dedicated search index and the second dedicated search index being associated with the one entity type based on the partitioning scheme when one of the first partitioned search index or the second partitioned search index is identified as the first dedicated search index; and
identifying one of the first partitioned search index or the second partitioned search index to be a first shared search index and portioning the first shared search index into first and second shared search indexes when one of the first partitioned search index or the second partitioned search index is identified as the first shared search index;
wherein identifying the search index to be partitioned comprises:
determining a size of the search index to be partitioned;
comparing the size against a size threshold;
determining the size exceeds the size threshold; and
initiating partitioning for the search index to be partitioned based on the determination that the search index exceeds the size threshold.

14. The method of claim 1, wherein partitioning the search index into the first partitioned search index and the second partitioned search index comprises:
allocating one or more of the plurality of entity types to the first partitioned search index;
allocating a remaining portion of the plurality of entity types which are not allocated to the first partitioned search index to the second partitioned search index; and
partitioning the search index into the first partitioned search index and the second partitioned search index in accordance with the allocations.

15. The method of claim 1, wherein partitioning the search index into the first partitioned search index and the second partitioned search index comprises:
cloning the search index in its entirety to create a first search index clone and a second search index clone;
deleting all entity types within the first subset of the plurality of entity types from the second search index clone;
deleting all entity types within the second subset of the plurality of entity types from the first search index clone;
designating the first search index clone as the first partitioned search index;
designating the second search index clone as the second partitioned search index; and
updating the partitioning scheme in accordance with the partitioning.

16. The method of claim 1, further comprising:
receiving a search request from an entity associated with an OrgID, the search request specifying data stored within the data store of the host organization indexed according to the partitioning scheme by the dedicated search index; and sending the search request to one of a plurality of work thread processors or to a bank of work thread processors to implement the requested search.

17. The method of claim 1, further comprising:
determining the dedicated search index exceeds a size threshold;
adding a new second dedicated search index that provides indexing for the same one entity type as the first dedicated search index resulting in each of the first dedicated search index and the second dedicated search index being associated with the one entity type based on the partitioning scheme, and further wherein the one entity type is only associated with the first dedicated search index and the second dedicated search index based on the partitioning scheme.

18. The method of claim 1:
wherein correlating the first subset of the plurality of entity types with the first partitioned search index and correlating the second subset of the plurality of entity types with the second partitioned search index comprises modifying a tree within the partitioning scheme;
wherein the tree comprises a plurality of nodes organized according to binary strings associated with the nodes, each of the plurality of nodes having a binary string with one or more significant digits in binary form; and
wherein modifying the tree comprises:
replacing one of the plurality of nodes corresponding to the search index with two new nodes, a first new node corresponding to the first partitioned search index and a second new node corresponding to the second partitioned search index,
assigning the binary string of the replaced node to the first new node,
adding a significant digit to the binary string of the first new node with a "0" binary value,
allocating the entity types of the first subset of entity types to the first new node,
assigning the binary string of the replaced node to the second new node,
adding a significant digit to the binary string of the second new node with a "1" binary value, and
allocating the entity types of the second subset of entity types to the second new node.

19. The method of claim 18, further comprising:
receiving a search request specifying an entity type to search;
executing a hash function against the specified entity type to search to generate a corresponding binary string for the specified entity type to search;
comparing the corresponding binary string for the specified entity type against the significant digits of the plurality of nodes in the tree until a single matching node is identified based on the binary string of the identified node; and
searching an index within the identified node.

20. The method of claim 1, wherein the data store comprises a multi-tenant database implementation having elements of hardware and software that are shared by a plurality of separate and distinct customer organizations.

21. The method of claim 20, wherein the multi-tenant database implementation stores a plurality of data elements comprising a first portion of the plurality of data elements residing within a non-relational data store of the multi-tenant database implementation and a second portion of the plurality of data elements residing within a relational data store of the multi-tenant database implementation.

22. A non-transitory computer readable storage medium having instructions stored thereon that, when executed by a processor of a host organization, the instructions cause the host organization to perform operations comprising:
identifying a shared search index to be partitioned based on the shared search index having grown in size to exceed a threshold, wherein the shared search index provides indexing for a plurality of entity types, each of the plurality of entity types associating records stored in a data store of the host organization with the respective entity type of the shared search index;
partitioning, via the partition manager, the search index into a first partitioned search index and a second partitioned search index;
correlating, via a partitioning scheme, a first subset of the plurality of entity types with the first partitioned search index;
correlating, via the partitioning scheme, a second subset of the plurality of entity types with the second partitioned search index, wherein each of the first and second subsets are non-overlapping and wherein a sum of all entity types within the first and the second subsets constitute all of the entity types previously associated with the shared search index prior to its being partitioned;
determining the first partitioned search index correlates to only one single entity type based on the partitioning scheme, subsequent to the partitioning; and
promoting the first partitioned search index to a dedicated search index associated with the only one single entity type based on the partitioning scheme.

23. The non-transitory computer readable storage medium of claim 22, wherein the instructions cause the host organization to perform further operations, comprising:
allocating a primary key to each of the plurality of entity types by executing a hash function against a string label identifying each respective entity type associated to generate the primary key in binary form;
storing the allocated primary keys for the plurality of entity types within the partitioning scheme;
receiving a search request specifying an entity type to search;
executing the hash function against the specified entity type to search to generate a corresponding binary string for the specified entity type to search;
identifying either the first partitioned search index or the second partitioned search index by comparing the corresponding binary string for the specified entity type to search against the allocated primary keys stored within the partitioning scheme; and
searching either the first partitioned search index or the second partitioned search index based on the identification.

24. A system comprising:
a processor and a memory;
a communications interface to a data store;
a partition manager to identify a shared search index to be partitioned based on the shared search index having grown in size to exceed a threshold, wherein the shared search index provides indexing for a plurality of entity types, each of the plurality of entity types associating records stored in a data store of the host organization with the respective entity type of the shared search index;
the partition manager to further partition search index into a first partitioned search index and a second partitioned search index;

a partitioning scheme to correlate a first subset of the plurality of entity types with the first partitioned search index;

the partitioning scheme to further correlate a second subset of the plurality of entity types with the second partitioned search index, wherein each of the first and second subsets are non-overlapping and wherein a sum of all entity types within the first and the second subsets constitute all of the entity types previously associated with the shared search index prior to its being partitioned;

the partition manager to further determine the first partitioned search index correlates to only one single entity type based on the partitioning scheme, subsequent to the partitioning; and the partition manager to further promote the first partitioned search index to a dedicated search index associated with the only one single entity type based on the partitioning scheme.

25. The system of claim 24, further comprising:

a hashing module to perform consistent hashing against string identifiers for the plurality of entity types to generate binary strings as an output of the hashing module, wherein the binary strings generated by the hashing module are allocated to the plurality of entity types as primary keys, and wherein the binary strings generated by the hashing module are further used to locate corresponding search indexes.

\* \* \* \* \*